United States Patent
Smith et al.

(10) Patent No.: US 11,959,429 B2
(45) Date of Patent: Apr. 16, 2024

(54) METHOD FOR ESTIMATING THE EFFICIENCY LOSS OF A TURBOCHARGER FOR AN ENGINE

(71) Applicant: Caterpillar Inc., Peoria, IL (US)

(72) Inventors: Stuart Paul Smith, Stamford (GB); Alistair James Dales, Orton Longueville (GB); Ross Daniel Collins, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/797,751

(22) PCT Filed: Feb. 1, 2021

(86) PCT No.: PCT/US2021/015998
§ 371 (c)(1),
(2) Date: Aug. 5, 2022

(87) PCT Pub. No.: WO2021/158461
PCT Pub. Date: Aug. 12, 2021

(65) Prior Publication Data
US 2023/0086963 A1 Mar. 23, 2023

(30) Foreign Application Priority Data
Feb. 6, 2020 (GB) ...................................... 2001585

(51) Int. Cl.
*F02D 41/00* (2006.01)
*F02B 37/12* (2006.01)
(Continued)

(52) U.S. Cl.
CPC .......... *F02D 41/0007* (2013.01); *F02B 37/12* (2013.01); *F02B 39/16* (2013.01);
(Continued)

(58) Field of Classification Search
CPC ......... F02D 41/1461; F02D 2200/0416; F02B 2039/162
See application file for complete search history.

(56) References Cited

U.S. PATENT DOCUMENTS

| | | | |
|---|---|---|---|
| 4,548,040 A | 10/1985 | Miller et al. | |
| 5,479,818 A | 1/1996 | Walter et al. | |
(Continued)

FOREIGN PATENT DOCUMENTS

| | | |
|---|---|---|
| EP | 3037641 A1 | 6/2016 |
| FR | 2821889 A1 | 9/2002 |
(Continued)

OTHER PUBLICATIONS

International Search Report related to Application No. PCT/US2021/015998; dated May 26, 2021.
(Continued)

*Primary Examiner* — Ngoc T Nguyen

(57) ABSTRACT

The present disclosure relates to improvements in turbocharger efficiency and more particularly to a method and system for estimating the efficiency loss of a turbocharger. The method comprises the steps of monitoring a plurality of operating parameters and determining a compressor exit temperature according to a first calibration map based on these operating parameters. An estimate of instantaneous turbocharger efficiency loss according to a second calibration map is then determined, based on the compressor exit temperature. The instantaneous turbocharger efficiency loss is used to determine an estimate of cumulative turbocharger efficiency loss during engine service. The estimate of cumulative turbocharger efficiency loss is compared with a first predetermined efficiency loss threshold and a first signal is generated if the first predetermined efficiency loss threshold is exceeded.

10 Claims, 3 Drawing Sheets

(51) Int. Cl.
　　　*F02B 39/16*　　　(2006.01)
　　　*F02D 23/00*　　　(2006.01)
　　　*F02D 41/14*　　　(2006.01)

(52) U.S. Cl.
　　　CPC ......... *F02D 23/00* (2013.01); *F02D 41/1461* (2013.01); *F02B 2039/162* (2013.01); *F02D 2200/0416* (2013.01)

(56) References Cited

U.S. PATENT DOCUMENTS

| | | |
|---|---|---|
| 6,401,457 B1 | 6/2002 | Wang et al. |
| 7,104,120 B2 | 9/2006 | Gladden |
| 7,801,660 B2 | 9/2010 | Zhang et al. |
| 2014/0326225 A1 | 11/2014 | Shioda et al. |
| 2015/0275753 A1 | 10/2015 | Pfister et al. |
| 2018/0340542 A1 | 11/2018 | Sundararajan et al. |

FOREIGN PATENT DOCUMENTS

| | | | | |
|---|---|---|---|---|
| GB | 2487952 A | | 8/2012 | |
| JP | 3045041 B2 | | 5/2000 | |
| JP | 2012136945 A | | 7/2012 | |
| JP | 2014015876 A | | 1/2014 | |
| JP | 2019183674 A | * | 10/2019 | |
| JP | 2019183674 A | | 10/2019 | |
| JP | 2019190435 A | * | 10/2019 | |
| JP | 2019190435 A | | 10/2019 | |
| WO | WO-2013080600 A1 | * | 6/2013 | ............. B60T 17/02 |

OTHER PUBLICATIONS

Great Britain Search Report related to Application No. 2001585.5; dated Jul. 29, 2020.

* cited by examiner

METHOD FOR ESTIMATING THE EFFICIENCY LOSS OF A TURBOCHARGER FOR AN ENGINE

CROSS-REFERENCE TO RELATED APPLICATION

This Application is a 35 USC § 371 US National Stage filing of International Application No. PCT/US2021/015998 filed of Feb. 1, 2021 which claims priority under the Paris Convention to Great Britain Patent Application No. 2001585.5 filed of Feb. 6, 2020.

TECHNICAL FIELD

The present disclosure relates to improvements in turbocharger efficiency and more particularly to a method and system for estimating the efficiency loss of a turbocharger.

BACKGROUND

Internal combustion engines are supplied with a mixture of air and fuel for combustion within the engine to generate mechanical power. To maximize the power generated by this combustion process, the engine is often equipped with a turbocharged fluid (usually air) induction system, generally referred to as a turbocharger. An internal combustion engine may therefore include one or more turbochargers for compressing the fluid to be supplied to one or more combustion chambers within corresponding combustion cylinders. Each turbocharger typically includes a turbine, driven by exhaust gases from the engine, and a compressor driven by the turbine. The compressor receives the fluid to be compressed and supplies the compressed fluid to the combustion chambers. The fluid compressed by the compressor may be in the form of combustion air only, or may be a mixture of fuel and combustion air. Through the use of a turbocharger, the power available from an engine of a given size can be increased significantly.

Engines that may be exposed to extended running at high ambient temperatures and/or high duty factors may experience elevated turbocharger compressor temperatures. As the temperatures inside the turbocharger gets higher, the speed of the turbocharger can no longer increase efficiently, which may lead to a reduction in engine performance. Whilst internal combustion engines may be designed with open or closed-circuit breather systems, closed-circuit breather systems are mostly used now, which may lead to additional fouling problems. During the compression and power strokes in an internal combustion engine, the difference in gas pressures above and below a piston may be sufficient to cause leakage (blow-by) of gas past the piston into the engine crankcase. The resulting increase in pressure within the crankcase may force oil (vapour or liquid) past by the engine oil seals and this pressure may also damage the seals and hence lead to further leakage of oil. To diminish the damaging effects of blow-by, it is normal to relieve the crankcase pressure either by venting the breather gas to atmosphere via an open breather or by connecting the crankcase to the engine air intake system whereby breather gas is conveyed to the engine combustion chamber via the engine air inlet system and under the control of a pressure regulating means. This latter system constitutes a closed-circuit breather system.

In breather systems it is desirable to include means to retrieve oil contained in breather gas and to return this to the engine lubricating oil sump for re-use. Otherwise, the carry-over of oil may lead to pollution and, in a closed-circuit system, to fouling of turbocharger compressor vanes, engine poppet valves and other components in contact with inlet air.

As well as potentially leading to contamination and emission problems, the carry-over of oil in breather gas may reduce the volume of oil available for the lubricating and cooling requirements of the engine. It is desirable to minimise oil carry-over, and an oil/air separator may therefore be included in most closed-circuit breather systems.

Current internal combustion engines typically have a closed-circuit breather separator which operates at 80-90% efficiency. At elevated temperatures, and particularly when operating at elevated temperatures for extended periods, the carry-over oil may get burnt onto the compressor wheel, thereby causing fouling. Such fouling may result in a noticeable drop in turbocharging efficiency and hence engine performance. In a worst case situation, compressor seizure and component failure has been observed during endurance validation. Currently, this fouling cannot be measured by existing engine sensors and detection of any issue resulting from fouling is reliant on a blanket service routine.

U.S. Pat. No. 7,801,660 discloses a system for estimating impact of compressor fouling in a power plant. This system comprises a control unit that communicates with one or more monitoring devices and receives the current performance data. The control unit includes a program logic that calculates the fouling of the compressor and a recoverable impact on the fuel consumption of the combined cycle power plant based on the recoverable impact on efficiency.

It is an object of the present disclosure to provide a method and system for estimating the efficiency loss of a turbocharger due to compressor fouling.

SUMMARY

Embodiments of the present disclosure provide methods and systems for processing the efficiency loss of a turbocharger due to compressor fouling, while the turbocharger is in service, and providing warnings and/or controlling the turbocharger if the efficiency loss falls below a threshold.

In embodiments of then present disclosure, efficiency loss of an engine turbocharger, during service in an engine, is monitored by measuring a plurality of operating parameters of the turbocharger. These parameters are used calibration map to process a compressor exit temperature. In turn, the compressor exit temperature is used with a further calibration map to process an estimate of instantaneous turbocharger efficiency loss according to a second calibration map. The instantaneous turbocharger efficiency loss is processed to determine an estimate of cumulative turbocharger efficiency loss during engine service, and this cumulative turbocharger efficiency loss can is compared with a first predetermined efficiency loss threshold. If cumulative turbocharger efficiency loss exceeds the first predetermined efficiency loss threshold a signal is generated, and this signal may generate a warning and/or be communicated to a controller to control operation of the turbocharger. The signal/warning may provide for maintenance of the turbocharger and the controller may control the turbocharger to operate in a safe regime until maintenance can be provided.

DETAILED DESCRIPTION

In embodiments of the present disclosure, operation of a turbocharger is monitored in order to maintain turbocharger efficiency and prevent damage to the turbocharger. To maintain and protect the turbocharger, efficiency loss of the turbocharger is processed in real-time, while the turbocharger is in service in an engine. Efficiency loss is processed by monitoring operating parameters of the turbocharger and determining a compressor exit temperature using a calibration map based on the turbocharger's operating parameters. An estimate of instantaneous turbocharger efficiency loss is found from a second calibration map using the determined compressor exit temperature. The instantaneous turbocharger efficiency loss is used to determine an estimate of cumulative turbocharger efficiency loss during engine service. The estimate of cumulative turbocharger efficiency loss is compared with a predetermined efficiency loss threshold if the predetermined efficiency loss threshold is exceeded a warning signal is generated and/or the turbocharger is controlled to prevent it being damage. The detection of the cumulative turbocharger efficiency loss exceeding the predetermined efficiency loss threshold can be used to make a maintenance decision with respect to the turbocharger and/or control of the turbocharger/engine to operate in a safe regime until service is provided.

Figure 1:
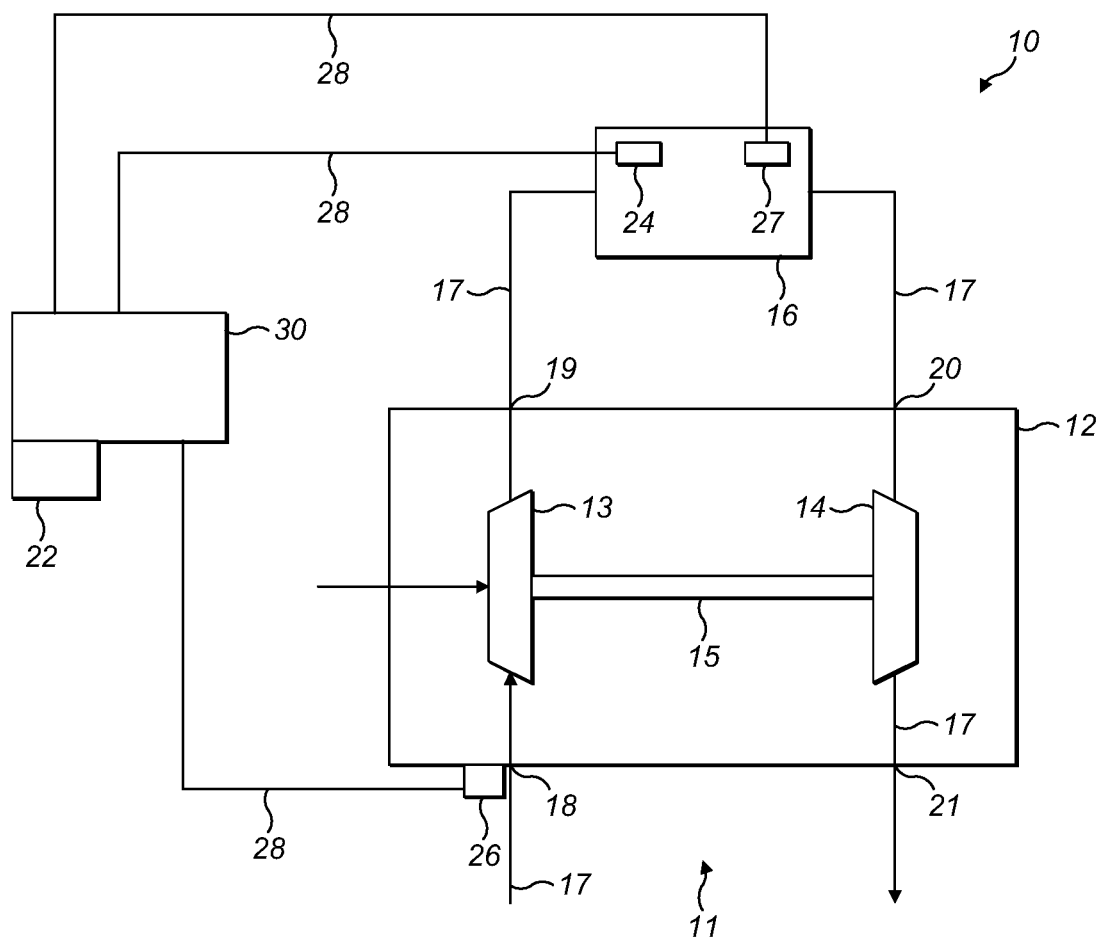
FIG. 1 is a schematic representation of a system for estimating the efficiency loss of a turbocharger according to the present disclosure.
Figure 3:
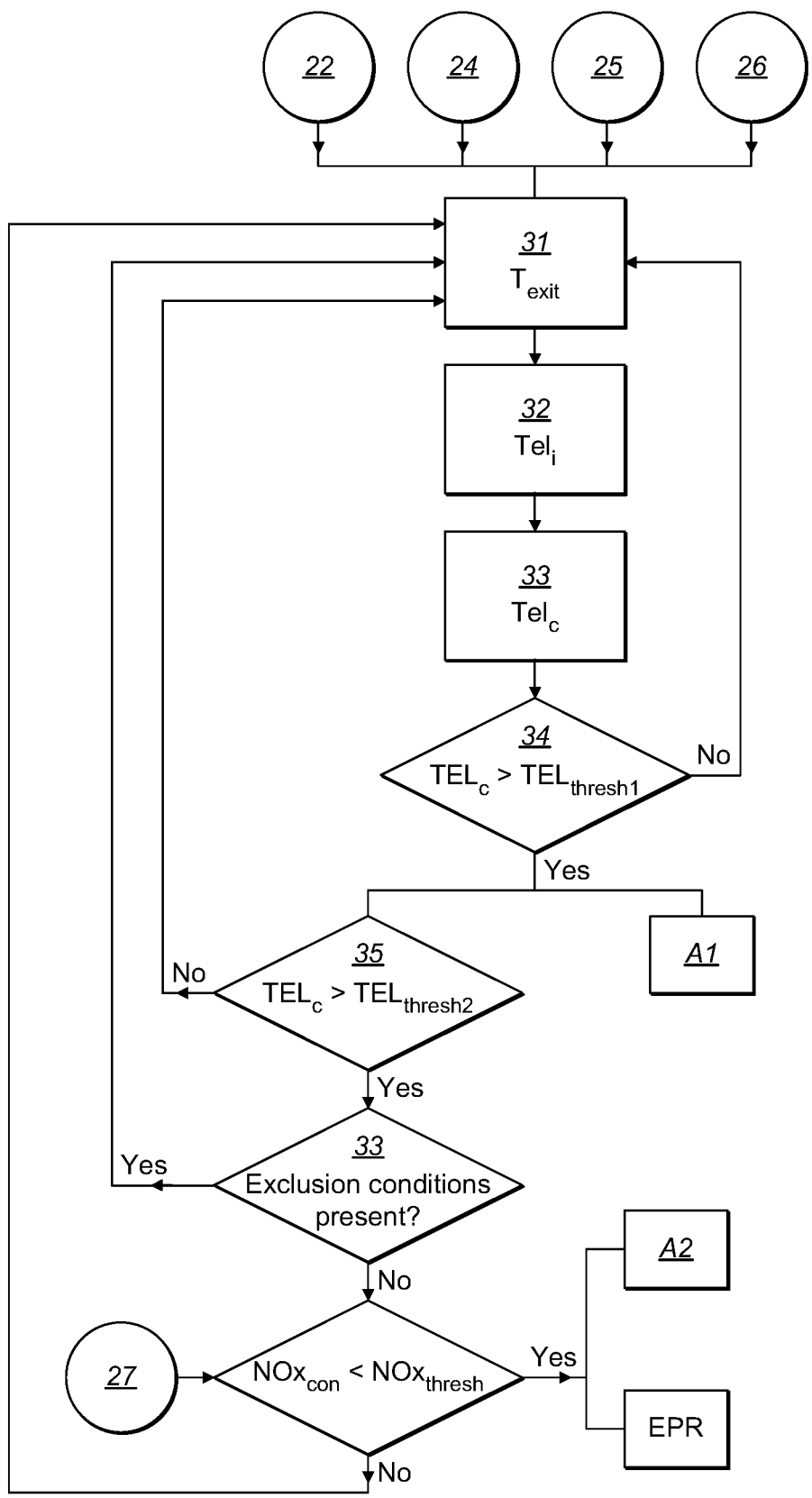
FIG. 3 is a flowchart showing the steps of the method of estimating the efficiency loss of a turbocharger used by the system of FIG. 1.

Referring to FIG. 1, there is shown a schematic representation of a system 10 suitable for operating the method for estimating the efficiency loss of a turbocharger 11 illustrated in FIG. 3 and disclosed herein. The system 10 may comprise a turbocharger 11 for an engine 16. The turbocharger 11 may be mounted within a turbocharger housing 12. The turbocharger 11 may include a compressor wheel 13 and a turbine wheel 14, which may be connected by a shaft 15 in a known manner. Fluid, usually air, may be circulated through the turbocharger 11 and an engine 16 via fluid lines 17. The turbocharger housing 12 may comprise a compressor inlet 18, a compressor outlet 19, a turbine inlet 20 and a turbine outlet 21. The system 10 may comprise a plurality of sensors for monitoring various parameters to be used in estimating the efficiency loss of the turbocharger 11. These may include:—
- a barometric pressure sensor 22, which may measure the barometric pressure ($P_{bar}$) of ambient air (or other fluid), which may be mounted on the electronic control module 30 (described in detail below);
- an engine speed sensor 24 may be positioned within the engine 16 in a conventional manner, which may measure engine speed ($\Omega$). The engine speed sensor 24 may be a crank speed sensor which monitors the position or rotational speed of the crankshaft, or another suitable type of sensor;
- a compressor inlet temperature sensor 26, which may measure the temperature ($T_{amb}$) of the ambient air or other fluid (i.e. intake air) entering the compressor inlet 18, which may be attached to the turbocharger housing 12 or it may be positioned at another point within one of the fluid lines 17 upstream of the compressor inlet 18; and
- a $NO_x$ sensor 27, which may be a high-temperature sensor for measuring the NOx (nitrogen oxide) concentration ($NO_{x_{con}}$) in the exhaust emissions of the engine 16, and may be located in the exhaust tailpipe (not shown) of a vehicle utilising the system 10.

The system 10 may comprise an electronic control module 30 (also known as an ECU or ECM) connected to the engine 16. The electronic control module 25 may carry out a number of functions, including monitoring the performance of the engine 16 and the turbocharger 11. The electronic control module 30 may be part of the main control system (not shown) of a machine or vehicle in which the system 10 is installed, which monitors and controls other functions of the machine or vehicle and the engine 16. Alternatively, it may be a separate module. The electronic control module 30 may comprise a memory, which may store instructions or algorithms in the form of data, and a processing unit, which may comprise software which is configured to perform operations based upon the instructions. The memory may comprise any suitable computer-accessible or non-transitory storage medium for storing computer program instructions, such as RAM, SDRAM, DDR SDRAM, RDRAM, SRAM, ROM, magnetic media, optical media and the like. The processing unit may comprise any suitable processor capable of executing memory-stored instructions, such as a microprocessor, uniprocessor, a multiprocessor and the like.

The electronic control module 30 may also include a service hour meter, which measures each period of engine run time to determine the engine service life ($t_{engine}$), which is total number of hours which the engine 16 has run during its life.

The barometric pressure sensor 22, engine speed sensor 24, compressor inlet temperature sensor 26 and $NO_x$ sensor 27 may provide signals to the electronic control module 30 relating respectively to the parameters barometric pressure ($P_{bar}$), engine speed ($\Omega$), ambient temperature of the intake air ($T_{amb}$) and the concentration of nitrogen oxide ($C_{nox}$) via communication lines 28. The communication lines 28 may be hard wired or wireless.

In addition, another parameter, fuel injection quantity ($V_i$), may be determined by the electronic control module 30. The injection of fuel may be controlled by the electronic control module 30 and the fuel injection quantity ($V_i$), may be determined from the delivered fuel quantity and injection duration.

Calibration maps, also known as performance maps, and which may include fuel maps, efficiency maps and consumption maps), may used to represent the desired performance of the engine 16 and the turbocharger 11 at combinations of different loads and operating conditions. Where certain parameters cannot be measured or are difficult to measure, such calibration maps may enable certain output parameters to be predicted (determined) based on certain input parameters. The electronic control module 30 may therefore comprise memory configured to store such engine performance maps and may continuously use the input parameters, together with data from engine performance maps, to determine other parameters which are used in the turbocharger efficiency loss estimation method.

In the present system 10, the electronic control module 30 may store a compressor exit temperature map 31, which may be used in the method for estimating the efficiency loss of a turbocharger 11 to provide a determination of compressor exit temperature ($T_{exit}$), which is the temperature of the fluid at the compressor outlet 19. The compressor exit temperature may be difficult to measure directly, so the method utilises the compressor exit temperature map 31 to determine the compressor exit temperature ($T_{exit}$), as a function of engine speed ($\Omega$), barometric pressure ($P_{bar}$) and ambient temperature ($T_{amb}$), as measured by the barometric pressure sensor 22, engine speed sensor 24, compressor inlet temperature sensor 26 and $NO_x$ sensor 27 and the fuel quantity (V) as determined by the electronic control module 30. A tuneable low pass filter may be used to smooth the inputs due to transient engine changes. The compressor exit temperature map 31 may be compiled using empirically derived offline data, simulation data and or operational test data.

Figure 2:
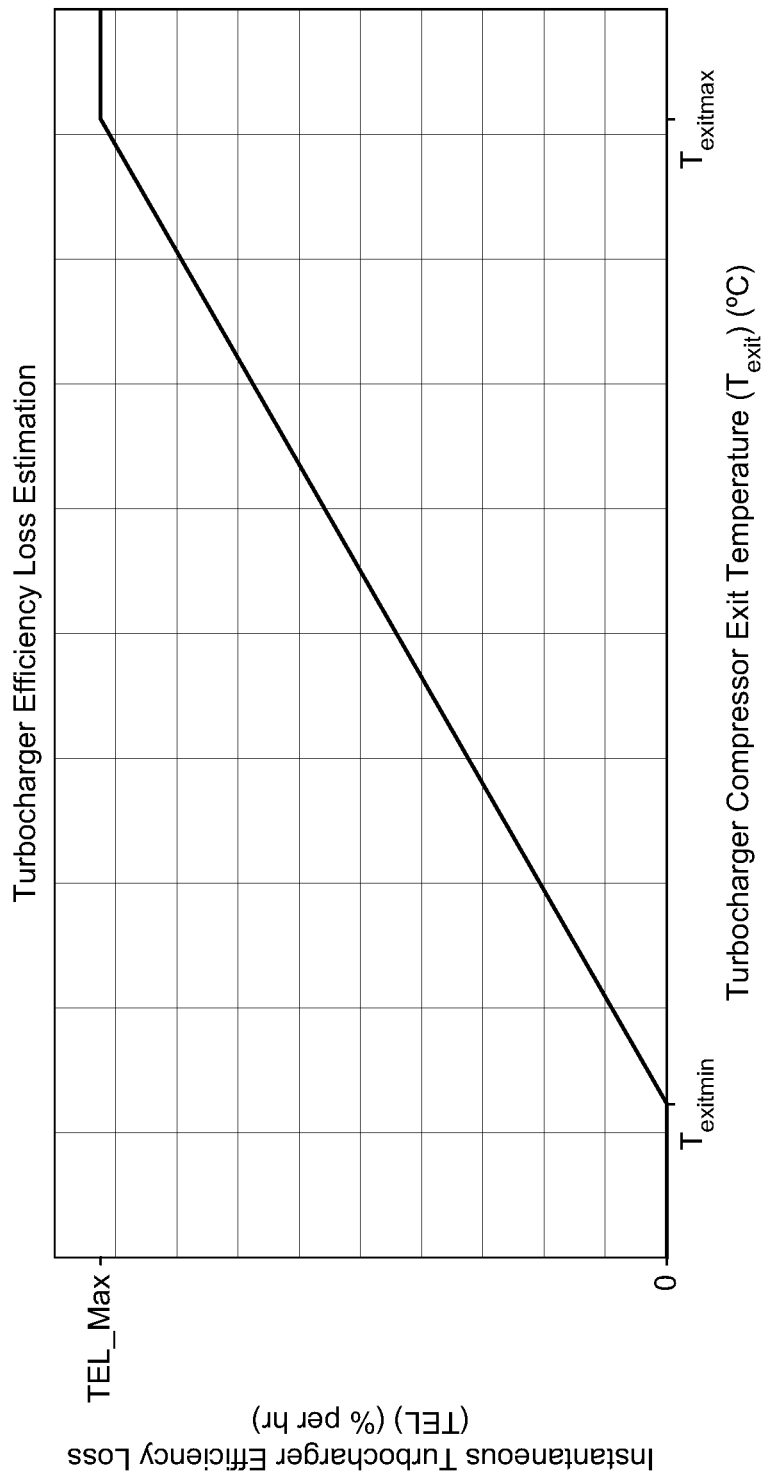
FIG. 2 is a graph showing turbocharger efficiency loss against compressor exit temperature.

The determined compressor exit temperature ($T_{exit}$) may be used as an input parameter to a compressor fouling damage map 32, which may also be stored in the electronic control module 30. The compressor fouling damage map 32 may provide a determination of instantaneous turbocharger efficiency loss percentage ($TEL_i$) versus the input compressor exit temperature ($T_e$). The compressor fouling damage map 32 may also be complied using empirically derived offline data and the output is illustrated in FIG. 2. The minimum compressor exit temperature ($T_{exitmin}$), over the estimated life of the engine, at which fouling is unlikely to occur can be determined from simulation, and this may be set as the initiation point of the gradient. Simulation may be used to show that there is a linear increase in the percentage of compressor fouling, such that the time taken to reach the fouling rate threshold of concern in a worst case scenario. Furthermore, the maximum safe operating temperature for the engine 16 may also be known or predicted and this may be used to set the maximum compressor exit temperature ($T_{exitmax}$) for the end of the gradient. Thus, using test data and modelling, the instantaneous turbocharger efficiency loss ($TEL_i$) as a percentage over time (i.e. time of current operation) may be plotted against the input compressor exit temperature ($T_c$).

The electronic control module 30 may use the instantaneous turbocharger efficiency loss percentage (TELi) to determine a cumulative turbocharger efficiency loss percentage ($TEL_c$) over the engine service life ($t_{engine}$) of the turbocharger 11. This may be calculated by integrating the instantaneous efficiency loss ($TEL_i$) over engine service life ($t_{engine}$). The cumulative turbocharger efficiency loss percentage ($TEL_c$) may be stored in the non-volatile memory of the electronic control module 30 and may be updated periodically, for example each time the engine 16 is keyed (switched) off or after a predetermined period of operation. The integrator may be designed to allow both incremental and decremental accumulation should engine level analysis show that running in certain operating conditions results fouling recovery and hence the efficiency improves and limited to an overall range of 0% to 100%.

When the electronic control module 30 is powered up, the integral should initialise to the previous stored cumulative turbocharger efficiency loss percentage ($TEL_c$), and the integral should then accumulate from this point during the subsequent power cycle.

The cumulative turbocharger efficiency loss percentage ($TEL_c$), which indicates the overall drop in turbocharger efficiency, may be compared against one or more predetermined efficiency loss thresholds, and if the threshold is exceeded may generate a signal. The signal may trigger an alert which may be displayed or communicated to an operator, a service team or a dealer. In the present example, there are 2 threshold levels:— level 1 efficiency loss threshold ($TEL_{thresh1}$) may be set at a level where the estimated efficiency loss is not at a level where immediate action should be taken as there is no imminent risk of damage due to fouling, but it would be advisable to take action at the next scheduled service. If the cumulative turbocharger efficiency loss percentage ($TEL_c$) exceeds the level 1 efficiency loss threshold ($TEL_{thresh1}$), then a turbocharger low efficiency level 1 event alert (A1) may be triggered;

level 2 efficiency loss threshold ($TEL_{thresh2}$) may be set at a level where the estimated efficiency loss is at a level where immediate action should be taken as there is an imminent risk of damage to the turbocharger 11 due to compressor fouling. Such action may be to derate the engine, which may limit either the power or vehicle speed, which may reduce the quantity of fuel being injected into the engine 16, and may thereby reduce the temperature, which in turn may decrease the risk of further fouling. If the cumulative turbocharger efficiency loss percentage ($TEL_c$) exceeds the level 2 efficiency loss threshold ($TEL_{thresh2}$), then a turbocharger low efficiency level 2 event alert (A2) may be triggered;

Although in this example, there are two efficiency loss thresholds, the system 10 may only have one, or it may have more than two, each giving a different alert according to the threshold exceeded.

Before the turbocharger low efficiency level 2 event alert (A2) is issued, the system 10 may make a further check, based on NOx concentration ($NOx_{con}$) in the exhaust gas. NOx (or nitrogen oxide) is a chemical in automotive exhaust that gets created when the temperature inside a vehicle engine's combustion chamber exceeds 1370° C. Selective catalytic reduction (SCR) aftertreatment systems may be used to convert NOx which may be produced into less harmful emissions, such as nitrogen and water. The SCR system may comprise a catalyst which facilitates a reaction between the NOx, which may be present in a gas stream passing through the SCR system, and a reductant in order substantially to remove the NOx from the gas stream. As the temperature of the engine 16 directly affects NOx levels, a further check may be made to determine whether that a high level on NOx is due to other factors rather than compressor fouling.

The NOx concentration ($NOx_{con}$) may be compared to a predetermined NOx threshold ($NOx_{thresh}$) and if the NOx concentration ($NOx_{con}$) exceeds the predetermined NOx threshold ($NOx_{thresh}$), this may trigger the turbocharger low efficiency level 2 event alert. The NOx concentration ($NOx_{con}$) may be measured as parts per million (ppm) and may be converted to grams of emissions that an engine produces per kilowatt hour (g/kWh) using a known formula if the predetermined NOx threshold ($NOx_{thresh}$) is set in g/kWh.

On engines with SCR based aftertreatment systems and a tailpipe NOx, the NOx concentration ($NOx_{con}$) may already be directly monitored by the SCR Control strategy. On engines where there is no SCR based aftertreatment treatment system, and no NOx sensor 27, a NOx estimation strategy may be used to estimate the "engine out" NOx concentration ($NOx_{con}$). In this example, the assumption is that, if the turbocharger starts to foul, a drop in turbocharger performance is picked up by EGR and Total Mass Air Flow estimations which are inputs to the EGR ratio and Burnt Gas Fraction calculations used as inputs to the NOx estimation strategy. As there is no SCR catalyst, the estimated engine out NOx concentration ($NOx_{con}$) will be equivalent to the NOx concentration ($NOx_{con}$) at the tailpipe after the diesel oxidation catalyst (DOC) and diesel particulate filter (DPF). Such a NOx estimation strategy may take the form of a complex model, such as a neural network, and/or a more simple NOx estimation lookup map.

In the present system 10, a NOx sensor installation status sensor (not shown) may be used to determine the installation status of the NOx sensor 27 and, if the NOx sensor installation status sensor determines that the NOx sensor 27 is installed, the system 10 may be directed to use the NOx concentration measured by the NOx sensor 27. If the NOx sensor installation status sensor determines that no NOx sensor 27 is installed, the system 10 may be directed to use the NOx estimation strategy to determine an estimate of the NOx concentration.

If the NOx sensor 27 is used to provide the NOx concentration ($NOx_{con}$) and a fault with the NOx sensor 27 is determined, the NOx concentration ($NOx_{con}$) may be set to 0 and the turbocharger low efficiency level 2 event may be suspended from triggering until the NOx concentration reading can be trusted. If the NOx emissions map is used to provide the NOx concentration, then there may be inherent fault logic in the NOx emissions map where it switches to an alternative NOx map estimate and this may still be used to provide the NOx concentration and the turbocharger low efficiency level 2 event alert may still trigger.

The turbocharger low efficiency level 1 event may be set to trigger an alert when the cumulative turbocharger efficiency loss ($TEL_c$) exceeds a first predetermined efficiency loss threshold. The alert may be programmed to only be reset via a service tool reset feature following cleaning of the turbocharger or replacement.

The turbocharger low efficiency level 2 event may be set to trigger an alert when the cumulative turbocharger efficiency loss ($TEL_c$) exceeds a second predetermined efficiency loss threshold, which is higher than the a first predetermined efficiency loss threshold and, where the NOx concentration ($NOx_{con}$) is also used an additional test, the NOx concentration ($NOx_{con}$) predetermined NOx concentration threshold ($NOx_{thresh}$) for a predetermined period ($t_{nox}$).

The predetermined NOx concentration threshold check may be excluded when the electronic control module 30 determines that certain operating conditions exist, such as the engine 16 is running in an operation or fault mode where there is a known elevated NOx condition. These conditions may include failure of the exhaust gas recirculation (EGR) system, which may cause the EGR valve to be closed or stuck; high temperature running conditions where EGR is reduced; and aftertreatment regeneration and warm up modes. For example, if the engine 16 is idling, the system 10 may determine that it is irrelevant if the NOx concentration is high as the temperature of the fluid at the compressor outlet 19 cannot exceed minimum compressor exit temperature ($T_{exitmin}$), and therefore compressor fouling cannot occur. An enablement map 33 may also be used to determine whether any of these operating conditions exist, which may use engine speed ($\Omega$) and fuel injection quantity ($V_i$) as input parameters for this determination. The NOx trigger may also be conditionally enabled to protect LRC engine hardware sets so that the diagnostic can trigger on applications where there is no capability to measure or estimate NOx. The overall event trigger may also be conditionally enabled so that the system 10 may be used on other platforms for monitoring turbocharger efficiency purposes, other than in vehicles. The alert may be programmed to only be reset via a service tool reset feature following cleaning of the turbocharger 11 or replacement.

The turbocharger low efficiency level 2 event alert may also be set to trigger an engine derate routine (EDR) for protection of the turbocharger 11. In this example, the derate percentage may be mapped as a function of the cumulative turbocharger efficiency loss ($TEL_c$)

INDUSTRIAL APPLICABILITY

The method and system for estimating the efficiency loss of a turbocharger is particularly suitable for use in an engine 16, such as an internal combustion engine, for a vehicle, although it may be extended to other applications. As it is not possible, whilst the engine 16 is in situ, to detect the actual fouling of a compressor wheel 13 resulting from carry-over oil being burnt onto it, there is a risk that, whilst such fouling may result in a noticeable drop in turbocharging efficiency and therefore engine performance, it may not be considered that fouling is the cause of such a drop. Thus, in many cases, compressor fouling may not be realised until a full service is carried out, which may mean that the fouling may have caused more damage than if it had been detected earlier or has resulted in non-compliance with emissions regulations.

The present method and system for estimating the efficiency loss of a turbocharger may therefore anticipate when fouling has reached a level that action should be taken, either immediately or at the next service. Different threshold levels may be set to generate different alerts, according to the severity of the estimated efficiency loss.

The method may further provide rationality checks to ensure that the likelihood of the loss of efficiency is a result of fouling, rather than other systems, such as the exhaust gas recirculation system, not functioning as expected.

The invention claimed is:

1. A method for estimating the efficiency loss of a turbocharger for an engine, said method comprising the steps of:—
    monitoring a plurality of operating parameters;
    determining a compressor exit temperature according to a first calibration map based on the plurality of operating parameters;
    determining an estimate of instantaneous turbocharger efficiency loss according to a second calibration map based on the compressor exit temperature;
    determining a NOx concentration in engine exhaust gas at the compressor outlet temperature according to a NOx concentration map for the estimate of instantaneous turbocharger efficiency loss;
    using the determined instantaneous turbocharger efficiency loss to determine an estimate of cumulative turbocharger efficiency loss during engine service;
    comparing the estimate of cumulative turbocharger efficiency loss with a first predetermined efficiency loss threshold;
    generating a first signal if the first predetermined efficiency loss threshold is exceeded.

2. The method as claimed in claim 1, further comprising:—
    a controller configured to control operation of the engine and/or the turbocharger to operate in a safe regime when the first signal is generated.

3. The method as claimed in claim 1, wherein the plurality of operating parameters comprise engine speed, fuel injection quantity, barometric pressure and ambient temperature.

4. The method as claimed in claim 1, wherein if the first predetermined efficiency loss threshold is exceeded, the estimate of cumulative turbocharger efficiency loss is compared with a second predetermined efficiency loss threshold, which is higher than the first predetermined efficiency loss threshold and, if the estimate of cumulative turbocharger efficiency loss exceeds the second predetermined efficiency loss threshold, a second signal is generated.

5. The method as claimed in claim 1, further comprising the steps of:—
   comparing the determined NOx concentration with a predetermined NOx threshold; and
   providing a second signal only if both the determined NOx concentration exceeds predetermined NOx threshold and the estimate of cumulative turbocharger efficiency loss a exceeds the second predetermined efficiency loss threshold.

6. The method as claimed in claim 1, further comprising the step of:—
   determining from a third calibration map the presence of any predetermined operating conditions; and
   excluding the step of comparing the determined NOx concentration with a predetermined NOx threshold if any such predetermined operating conditions are present.

7. The method as claimed in claim 6, wherein engine speed and fuel injection quantity are used by the third calibration map as input parameters for the determination whether any predetermined operating conditions are present.

8. The method as claimed in claim 7, wherein the predetermined operating conditions include an engine operation or fault mode where there is a known elevated NOx condition.

9. The method as claimed in claim 1, wherein the first and/or second signal triggers a first and/or second alert respectively and/or a change in engine and/or turbocharger operation.

10. The system configured to implement the method for estimating the efficiency loss of an engine turbocharger as claimed in claim 1, comprising:—
    an engine;
    a turbocharger;
    a plurality of sensors monitoring said plurality of operating parameters;
    a controller configured to receive signals relating to said plurality of engine operating parameters, said controller comprising a memory configured to store said calibration map(s), wherein the controller is configured to generate said signal(s).

* * * * *